US012717949B2

(12) United States Patent
Ishii

(10) Patent No.: US 12,717,949 B2
(45) **Date of Patent: *Aug. 25, 2026**

(54) DATA PROVIDING SYSTEM, DATA PROVIDING APPARATUS, AND DATA PROVIDING METHOD

(71) Applicant: NEC Corporation, Tokyo (JP)

(72) Inventor: Nobutaka Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 18/700,865

(22) PCT Filed: Nov. 8, 2021

(86) PCT No.: PCT/JP2021/040958

§ 371 (c)(1),
(2) Date: Apr. 12, 2024

(87) PCT Pub. No.: WO2023/079732

PCT Pub. Date: May 11, 2023

(65) Prior Publication Data

US 2024/0411911 A1 Dec. 12, 2024

(51) Int. Cl.

| | |
|---|---|
| ***G06F 21/62*** | (2013.01) |
| ***G01H 9/00*** | (2006.01) |
| ***G01K 11/32*** | (2021.01) |

(52) U.S. Cl.

CPC ......... *G06F 21/6218* (2013.01); *G01H 9/004* (2013.01); *G01K 11/32* (2013.01)

(58) Field of Classification Search

CPC ..... G06F 21/6218; G01H 9/004; G01K 11/32

See application file for complete search history.

(56) References Cited

U.S. PATENT DOCUMENTS

| | | | | |
|---|---|---|---|---|
| 8,768,965 | B2 * | 7/2014 | Kimball | G06F 3/048 715/741 |
| 9,286,797 | B1 | 3/2016 | Blandin et al. | |
| 11,322,976 | B1 * | 5/2022 | Anderson | G06N 3/08 |
| 11,360,107 | B1 * | 6/2022 | Young | G01N 35/1016 |
| 11,582,240 | B1 * | 2/2023 | Bhatt | G06F 21/6245 |

(Continued)

FOREIGN PATENT DOCUMENTS

| | | | |
|---|---|---|---|
| JP | 2004-021411 | A | 1/2004 |
| JP | 2008-282164 | A | 11/2008 |

(Continued)

OTHER PUBLICATIONS

JP Office Action for JP Application No. 2023-557581, mailed on Sep. 10, 2024 with English Translation.

(Continued)

*Primary Examiner* — Jason Chiang

(57) ABSTRACT

A data providing system (1) according to the present disclosure includes an optical fiber sensing unit (10) that acquires sensing data by executing optical fiber sensing, a processing unit (21) that generates processed data by executing processing on the sensing data, a level giving unit (22) that gives an access level according to a type to individual data included in the sensing data and the processed data, and a data providing unit (24) that provides the individual data to a customer according to the access level.

10 Claims, 7 Drawing Sheets

(56) References Cited

U.S. PATENT DOCUMENTS 12,281,933 B2 * 4/2025 Handerek .......... G01D 5/35364
12,470,263 B1 * 11/2025 Delfeld ................. G06F 9/5011
2002/0054152 A1 * 5/2002 Palaniappan ........... G06F 9/454 715/810
2012/0278901 A1 11/2012 Bünter
2014/0152982 A1 * 6/2014 Gosteli .............. G01N 21/8806 356/300
2016/0132801 A1 * 5/2016 Kala ................ G06Q 10/06311 705/7.13
2016/0191163 A1 * 6/2016 Preston ................... G01L 1/242 398/16
2017/0167249 A1 * 6/2017 Lee ......................... E21B 49/00
2018/0192130 A1 * 7/2018 Liston .................... H04N 21/47
2018/0270435 A1 * 9/2018 Chow ................ G01N 15/1433
2018/0357542 A1 * 12/2018 Wu .......................... G06N 5/01
2020/0167321 A1 * 5/2020 Sheehan ............. G06F 21/6209
2020/0209020 A1 * 7/2020 Issa ........................ G01H 9/004
2020/0261023 A1 * 8/2020 Werbin .................... A61B 5/01
2020/0288293 A1 * 9/2020 MacDonald ........ H04W 40/244
2021/0366608 A1 * 11/2021 Podobas ................ G16H 15/00
2022/0341729 A1 * 10/2022 Cunningham .......... G01M 3/24
2023/0075118 A1 * 3/2023 Yano .................... H04B 10/071
2023/0112149 A1 * 4/2023 Iwano .................... G01H 9/004 385/12
2024/0405866 A1 * 12/2024 Iwano .................. H04B 10/071
2024/0427912 A1 * 12/2024 Ishii ........................ G06F 21/62

FOREIGN PATENT DOCUMENTS

JP 2017-500624 A 1/2017
JP 2017-045355 A 3/2017
JP 2019-075019 A 5/2019
JP 2019-164402 A 9/2019
JP 2020-046920 A 3/2020
WO 2020/202694 A1 10/2020
WO 2021/070222 A1 4/2021

OTHER PUBLICATIONS

International Search Report for PCT Application No. PCT/JP2021/040958, mailed on Dec. 14, 2021.
International Search Report for PCT Application No. PCT/JP2021/035665, mailed on Dec. 14, 2021 with English translation.
US Office Action for U.S. Appl. No. 18/690,900, mailed on Sep. 15, 2025.
US Office Action for U.S. Appl. No. 18/690,900, mailed on Jan. 16, 2026.

* cited by examiner

1
DATA PROVIDING SYSTEM
20
DATA PROVIDING APPARATUS
30
10
OPTICAL FIBER SENSING UNIT
PROCESSING UNIT
21
LEVEL GIVING UNIT
22
STORAGE UNIT
23
DATA PROVIDING UNIT
24
EXISTING CUSTOMER
FIRST CUSTOMER
SECOND CUSTOMER
n-1TH CUSTOMER
NEW CUSTOMER
nTH CUSTOMER

| ACCESS LEVEL | TYPE |
|---|---|
| A | VIBRATION DATA AND FIRST PROCESSED DATA |
| B | AUDIO DATA AND SECOND PROCESSED DATA |
| C | TEMPERATURE DATA AND THIRD PROCESSED DATA |
| D | VIBRATION DATA AND FIRST PROCESSED DATA, AND AUDIO DATA AND SECOND PROCESSED DATA |
| E | VIBRATION DATA AND FIRST PROCESSED DATA, AND TEMPERATURE DATA AND THIRD PROCESSED DATA |
| F | AUDIO DATA AND SECOND PROCESSED DATA, AND TEMPERATURE DATA AND THIRD PROCESSED DATA |
| G | VIBRATION DATA AND FIRST PROCESSED DATA, AUDIO DATA AND SECOND PROCESSED DATA, AND TEMPERATURE DATA AND THIRD PROCESSED DATA |

Fig. 2

| PROCESSING STEP | ACCESS LEVEL |
| --- | --- |
| VIBRATION DATA AND FIRST PROCESSED DATA | A, D, E, G |
| AUDIO DATA AND SECOND PROCESSED DATA | B, D, F, G |
| TEMPERATURE DATA AND THIRD PROCESSED DATA | C, E, F, G |

Fig. 3

| CUSTOMER | ACCESS LEVEL |
| --- | --- |
| FIRST CUSTOMER | A |
| SECOND CUSTOMER | B |
| THIRD CUSTOMER | C |

Fig. 4

1B
DATA PROVIDING SYSTEM
20
DATA PROVIDING APPARATUS
30
10
OPTICAL FIBER SENSING UNIT
PROCESSING UNIT
21
LEVEL GIVING UNIT
22
STORAGE UNIT
23
DATA PROVIDING UNIT
24
EXISTING CUSTOMER
FIRST CUSTOMER
SECOND CUSTOMER
n−1TH CUSTOMER
NEW CUSTOMER
nTH CUSTOMER

DATA PROVIDING SYSTEM, DATA PROVIDING APPARATUS, AND DATA PROVIDING METHOD

This application is a National Stage Entry of PCT/JP2021/040958 filed on Nov. 8, 2021, the contents of all of which are incorporated herein by reference, in their entirety.

TECHNICAL FIELD

The present disclosure relates to a data providing system, a data providing apparatus, and a data providing method.

BACKGROUND ART

A technique for acquiring data by executing optical fiber sensing is known. In addition, a technique for generating other data by processing the acquired data is known. The generated data is used for a predetermined use (see, for example, Patent Literature 1).

The technique described in Patent Literature 1 executes optical fiber sensing when a person or a vehicle passes through a gate to acquire data indicating vibration generated by walking of the person or traveling of the vehicle after passing through the gate. The technique described in Patent Literature 1 processes the acquired data to generate data indicating an action pattern of the person or the vehicle after passing through a gate. The generated data is used for monitoring an action of the person or the vehicle after passing through the gate.

Note that, as other related techniques, a technique related to classification of a product or a service indicated by product data described in Patent Literature 2 is also known. In addition, a technique related to generation of product information described in Patent Literature 3 is also known.

CITATION LIST

Patent Literature

Patent Literature 1: International Patent Publication No. WO2020/202694

Patent Literature 2: Japanese Unexamined Patent Application Publication No. 2019-164402

Patent Literature 3: Japanese Unexamined Patent Application Publication No. 2019-075019

SUMMARY OF INVENTION

Technical Problem

Meanwhile, data (data before processing) acquired by executing optical fiber sensing and data (processed data) generated by processing the acquired data may include a plurality of types of data.

For example, the data before processing may include vibration data acquired by distributed vibration sensing (DVS), audio data acquired by distributed acoustic sensing (DAS), and temperature data acquired by distributed temperature sensing (DTS). Furthermore, the processed data may include data (data obtained by processing vibration data) used to provide a service related to vibration, data (data obtained by processing audio data) used to provide a service related to audio, and data (data obtained by processing temperature data) used to provide a service related to temperature.

It is preferable that the data before processing and the processed data be provided according to convenience (requirement) of a customer. In other words, it is preferable that the data before processing and the processed data are provided to the corresponding customer according to the type of the data. However, in the technique described in Patent Document 1, it is not assumed that the data before processing and the processed data (particularly, data before processing) are provided to the customer. Therefore, there is a problem that it is difficult to provide the data before processing and the processed data to a corresponding customer.

Therefore, in view of the above-described problems, an object of the present disclosure is to provide a data providing system, a data providing apparatus, and a data providing method capable of providing data before processing and processed data to a corresponding customer according to a type of the data.

Solution to Problem

According to one aspect, there is provided a data providing system including:

- an optical fiber sensing unit configured to acquire sensing data by executing optical fiber sensing;
- a processing unit configured to generate processed data by executing processing on the sensing data;
- a level giving unit configured to give an access level according to a type to individual data included in the sensing data and the processed data; and
- a data providing unit configured to provide the individual data to a customer according to the access level.

According to one aspect, there is provided a data providing apparatus including:

- a processing unit configured to generate processed data by executing processing on sensing data acquired by executing optical fiber sensing in an optical fiber sensing unit;
- a level giving unit configured to give an access level according to a type to individual data included in the sensing data and the processed data; and
- a data providing unit configured to provide the individual data to a customer according to the access level.

According to one aspect, there is provided a data providing method by a data providing apparatus, the data providing method including:

- a processing step of generating processed data by executing processing on sensing data acquired by executing optical fiber sensing in an optical fiber sensing unit;
- a level giving step of giving an access level according to a type to individual data included in the sensing data and the processed data; and a data providing step of providing the individual data to a customer according to the access level.

Advantageous Effects of Invention

According to the above aspect, it is possible to provide a data providing system, a data providing apparatus, and a data providing method capable of providing data before processing and processed data to a corresponding customer according to a type of the data.

BRIEF DESCRIPTION OF DRAWINGS

FIG. 2 is a diagram illustrating an example of an access level given by a level giving unit according to the first example embodiment.

FIG. 3 is a diagram illustrating an example of the access level given by the level giving unit according to the first example embodiment.

FIG. 4 is a diagram illustrating an example of information about an access level for each customer held by the data providing unit according to the first example embodiment.

EXAMPLE EMBODIMENT

Example embodiments of the present disclosure are described below with reference to the drawings. Note that in the description and drawings to be described below, omission and simplification are made as appropriate, for clarity of description. Furthermore, in each of the drawings to be described below, the same elements are denoted by the same reference signs, and an overlapping description will be omitted as necessary.

First Example Embodiment

First, a configuration example of a data providing system 1 according to the first example embodiment will be described with reference to FIG. 1.

Figure 1:
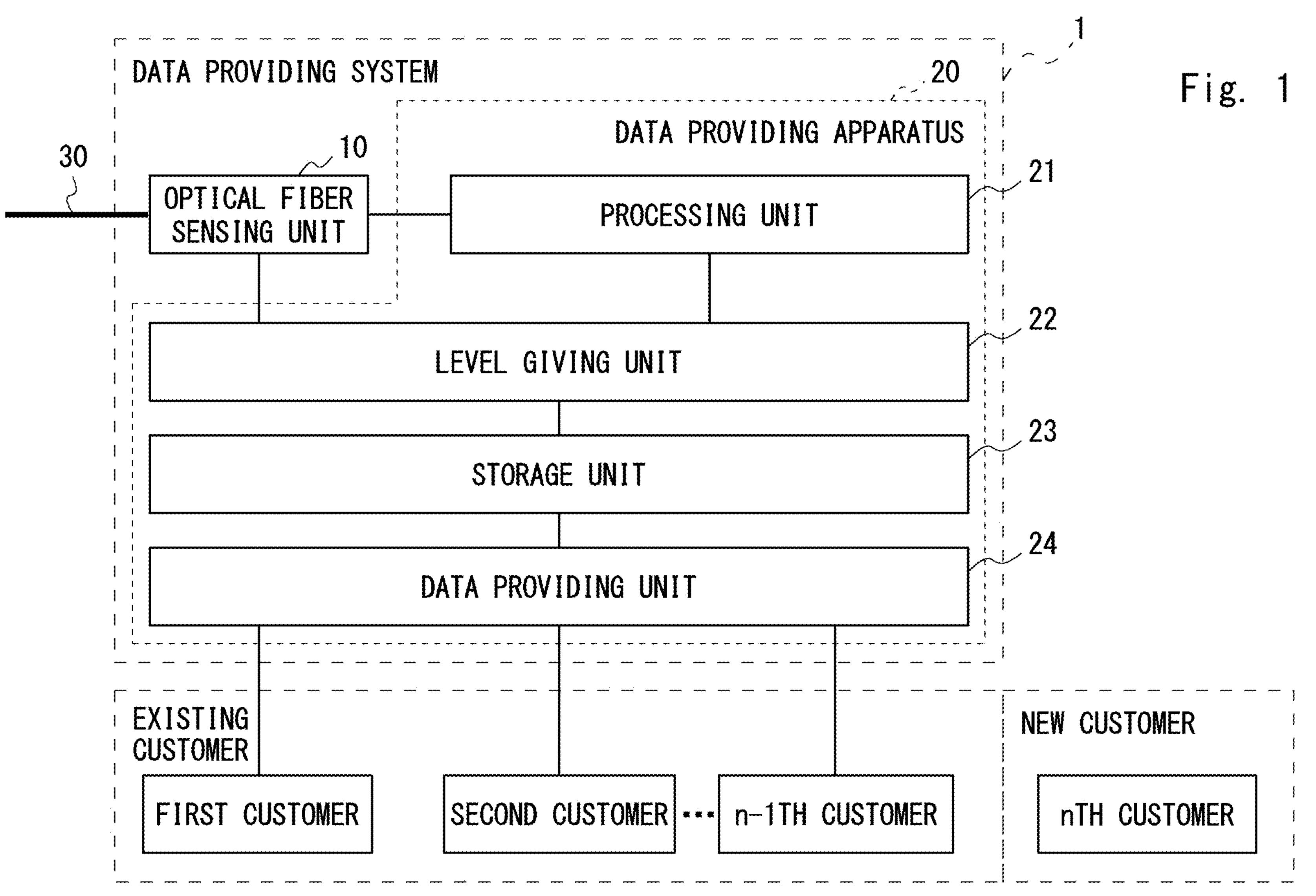
FIG. 1 is a diagram illustrating a configuration example of a data providing system according to a first example embodiment.

As illustrated in FIG. 1, a data providing system 1 according to the first example embodiment includes an optical fiber sensing unit 10 and a data providing apparatus 20. In addition, the data providing apparatus 20 includes a processing unit 21, a level giving unit 22, a storage unit 23, and a data providing unit 24.

The optical fiber sensing unit 10 includes a plurality of optical fiber sensing means (not illustrated) that acquires different types of sensing data. Each optical fiber sensing means includes a distributed fiber optic sensing (DFOS) device. Each optical fiber sensing means acquires sensing data by executing DFOS using the optical fiber cable 30. That is, the sensing data is so-called "raw data", "flow data", or the like.

Specifically, the plurality of optical fiber sensing means includes, for example, a first optical fiber sensing means, a second optical fiber sensing means, and a third optical fiber sensing means. The first optical fiber sensing means includes a DVS device, and acquires vibration data as sensing data. The second optical fiber sensing means includes a DAS device, and acquires audio data as sensing data. The third optical fiber sensing means includes a DTS device, and acquires temperature data as sensing data.

In FIG. 1, it is assumed that the plurality of optical fiber sensing means share the same optical fiber cable 30, but the present disclosure is not limited thereto. For example, each two optical fiber sensing means among the plurality of optical fiber sensing means may share the same optical fiber cable 30. Alternatively, the plurality of optical fiber sensing means may use the optical fiber cable 30 independent from each other.

The processing unit 21 includes a plurality of processing means (not illustrated) that execute different types of processing. Note that the processing unit 21 is provided inside the data providing apparatus 20, but may be provided in a cloud network. In addition, the level giving unit 22, the storage unit 23, and the data providing unit 24 to be described later may also be provided in a cloud network similar to the processing unit 21.

Specifically, the plurality of processing means includes, for example, a first processing means, a second processing means, and a third processing means. The first processing means executes predetermined processing (first processing) on the vibration data acquired by the first optical fiber sensing means in the optical fiber sensing unit 10 to generate data (first processed data) used for providing a service related to vibration. The second processing means executes another predetermined processing (second processing) on the audio data acquired by the second optical fiber sensing means in the optical fiber sensing unit 10 to generate data (second processed data) used for providing a service related to audio. The third processing means further executes another predetermined processing (third processing) on the temperature data acquired by the third optical fiber sensing means in the optical fiber sensing unit 10 to generate data (third processed data) used for providing a service related to a temperature.

Each of the first processing means, the second processing means, and the third processing means may be configured by dedicated artificial intelligence (AI). These AIs are generated by machine learning in advance.

Hereinafter, the first processed data, the second processed data, and the third processed data may be collectively referred to as "processed data". In addition, the sensing data and the processed data may be collectively referred to as "provision candidate data".

The level giving unit 22 gives an access level corresponding to a type of data to individual data included in the provision candidate data. For example, the type of sensing data is classified into vibration data, audio data, and temperature data based on a detection target (specifically, vibration, audio, and temperature) in optical fiber sensing. In addition, the type of the processed data is classified into the first processed data, the second processed data, and the third processed data based on a service (specifically, the service related to vibration, the service related to audio, and the service related to temperature) provided using the processed data.

At this time, for example, the level giving unit 22 gives access levels "A to G" as illustrated in FIG. 2 to individual data included in the provision candidate data. The example of FIG. 2 illustrates, for each access level, the type of data belonging to the access level. FIG. 2 is modified to illustrate, for each type of data, an access level to which the type of data belongs as illustrated in FIG. 3.

The storage unit 23 stores the provision candidate data. Note that individual data included in the provision candidate data is stored in the storage unit 23 in a state where a corresponding access level is given. For example, in the examples of FIGS. 2 and 3, an access level "A, D, E, G" is given to the vibration data. Therefore, the vibration data is stored in the storage unit 23 in a state where an access level "A, D, E, G" is given.

The data providing unit 24 provides the individual data included in the provision candidate data to the customer to which the corresponding access level is set. Note that providing data to a customer specifically means providing data to a device (for example, a personal computer, a server, a tablet terminal, a smartphone, a mobile phone, or the like, and the same applies hereinafter) of the customer.

Here, for an existing customer, as illustrated in FIG. 4, the data providing unit 24 holds information about the access level set for the customer for each customer. In the example of FIG. 4, the access level “A” is set to the first customer as the first customer has made a use contract for the service related to vibration. In addition, the access level “B” is set to the second customer as the second customer has made a use contract for the service related to audio. In addition, the access level “C” is set to the third customer as the third customer has made a use contract for the service related to temperature. In this case, the data providing unit 24 provides the vibration data and the first processed data among the provision candidate data to the first customer. In addition, the data providing unit 24 provides the audio data and the second processed data among the provision candidate data to the second customer. In addition, the data providing unit 24 provides the temperature data and the third processed data among the provision candidate data to the third customer.

Meanwhile, for a new customer, the data providing unit 24 sets an access level for the customer, adds information about the access level of the customer to the information of FIG. 4, and provides data corresponding to the access level to the customer. However, the function of setting the access level to the customer is not limited to being included in the data providing unit 24, and may be included in any component other than the data providing unit 24.

In addition, the data providing unit 24 receives a request from a customer and provides data to the customer. However, the data providing unit 24 is not limited thereto, and may automatically provide data to the customer periodically (for example, every month or the like).

Note that the storage unit 23 is not an essential component in the data providing system 1, and may be provided outside the data providing system 1. That is, the data providing system 1 may be realized by a minimum configuration including the optical fiber sensing unit 10, the processing unit 21, the level giving unit 22, and the data providing unit 24.

Next, an example of a schematic operation flow of the data providing system 1 according to the first example embodiment will be described with reference to FIG. 5.

Figure 5:
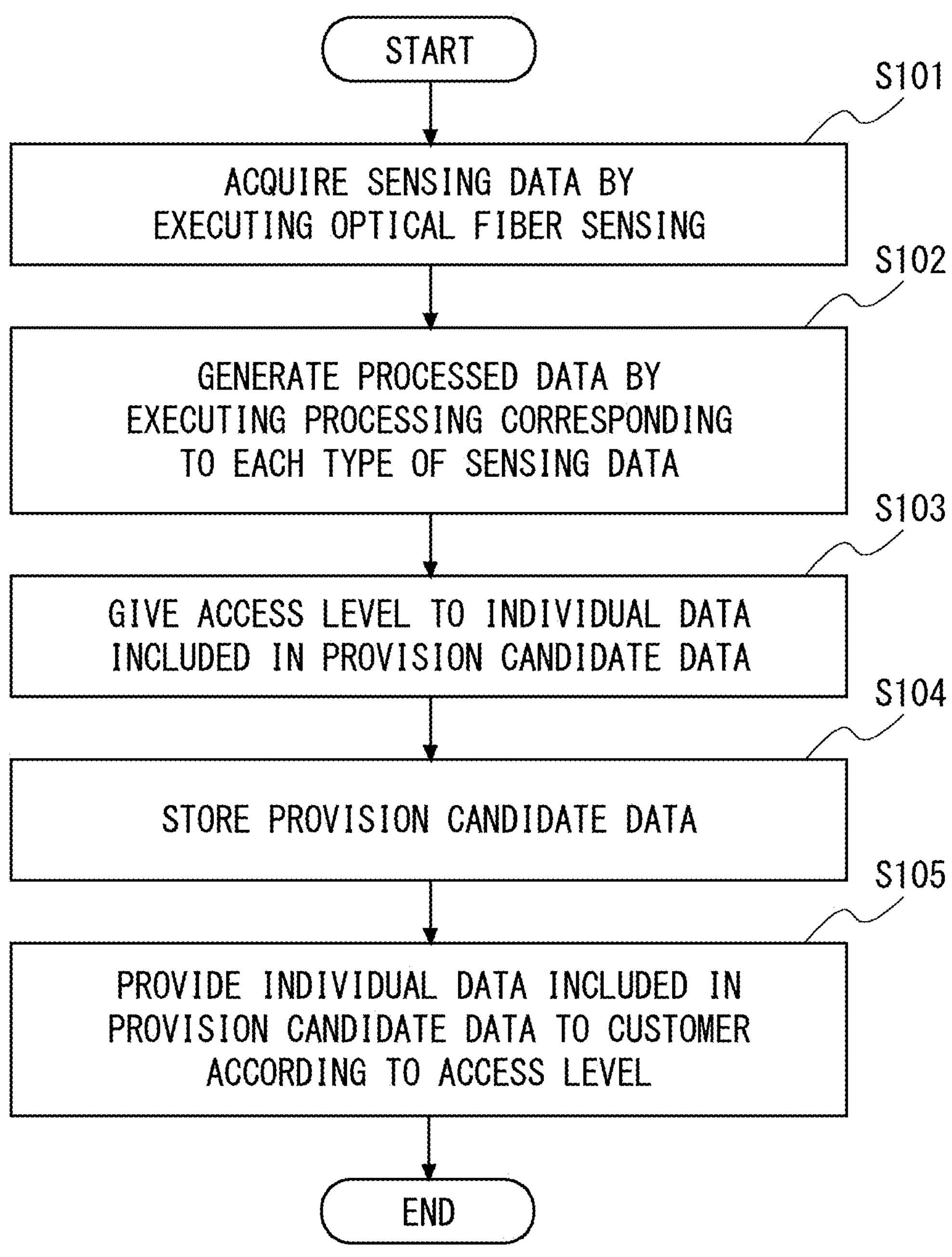
FIG. 5 is a flowchart illustrating an example of a flow of a schematic operation of the data providing system according to the first example embodiment.

As illustrated in FIG. 5, first, the optical fiber sensing unit 10 acquires different types of sensing data (for example, vibration data, audio data, and temperature data) by executing DFOS using the optical fiber cable 30 (Step S101).

Next, the processing unit 21 executes processing corresponding to each type of sensing data acquired by the optical fiber sensing unit 10 to generate different types of processed data (for example, the first processed data, the second processed data, and the third processed data) (Step S102).

Next, the level giving unit 22 gives an access level to individual data (for example, vibration data, audio data, temperature data, first processed data, second processed data, and third processed data) included in the provision candidate data according to the type thereof (Step S103).

Next, the storage unit 23 stores the individual data included in the provision candidate data in a state where the corresponding access level is given (Step S104).

The processing in Steps S101 to S104 described above is processing executed in advance before data is provided to the customer.

Thereafter, the data providing unit 24 provides the individual data included in the provision candidate data to the customer to which the corresponding access level is set (Step S105). At this time, for an existing customer, the data providing unit 24 determines an access level set for the customer, and provides data corresponding to the determined access level. In addition, for a new customer, the data providing unit 24 newly sets an access level for the customer and provides data corresponding to the set access level.

As described above, according to the first example embodiment, the level giving unit 22 gives an access level to individual data (for example, vibration data, audio data, temperature data, first processed data, second processed data, and third processed data) included in the provision candidate data according to the type thereof. The data providing unit 24 provides the individual data included in the provision candidate data to the customer to which the corresponding access level is set. As a result, the sensing data and the processed data can be provided to the corresponding customer according to the type thereof.

Second Example Embodiment

Next, a configuration example of a data providing system 1A according to the second example embodiment will be described with reference to FIG. 6.

Figure 6:
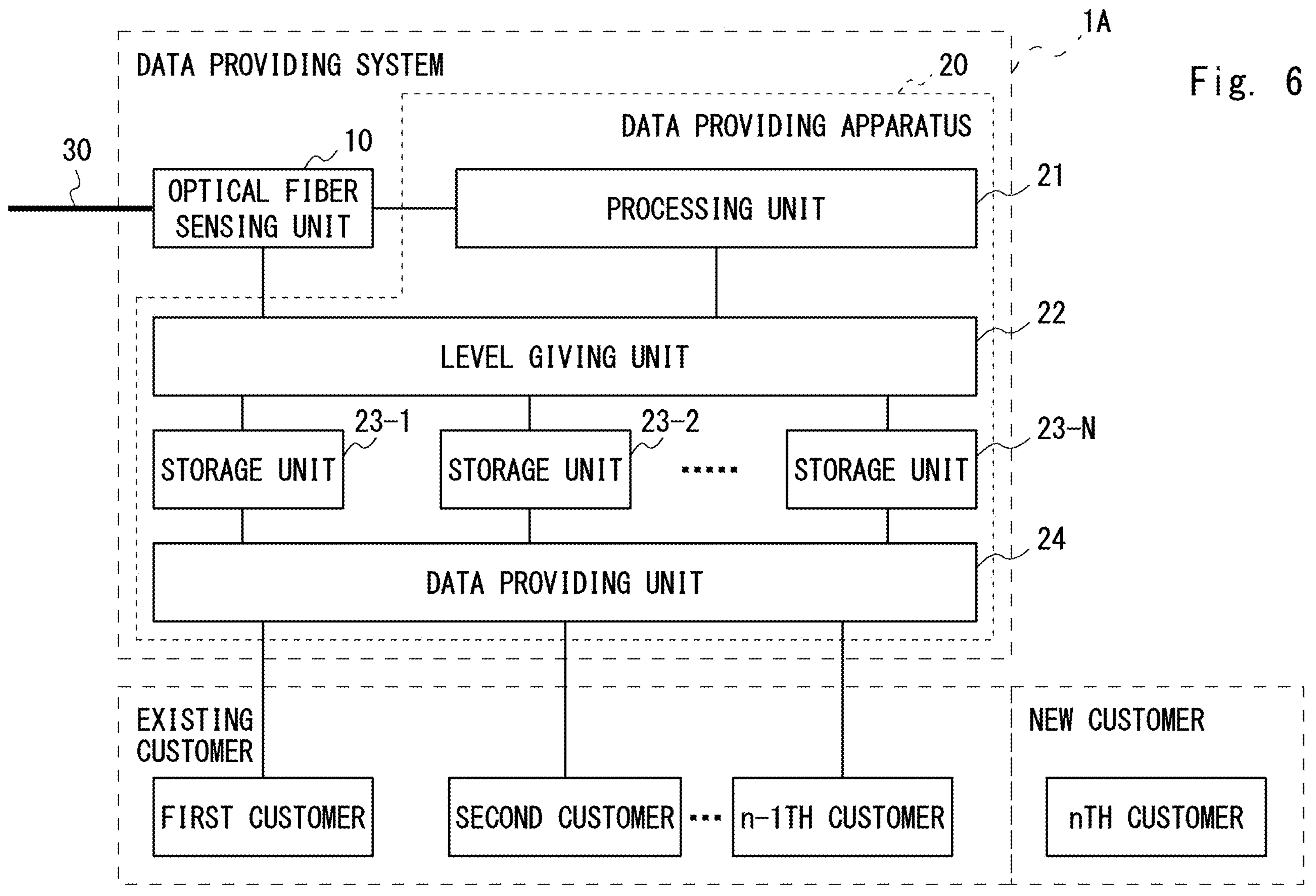
FIG. 6 is a diagram illustrating a configuration example of a data providing system according to a second example embodiment.

As illustrated in FIG. 6, the data providing system 1A according to the second example embodiment is different from the data providing system 1 according to the first example embodiment in that a plurality of storage units 23-1 to 23-N (N is an integer of 2 or more) is provided.

Each of the storage units 23-1 to 23-N stores data of a type corresponding to itself among the vibration data, the audio data, the temperature data, the first processed data, the second processed data, and the third processed data.

For example, N=3, and the data providing system 1A may include three storage units 23-1 to 23-3. In this case, for example, the vibration data and the first processed data may be stored in the storage unit 23-1, the audio data and the second processed data may be stored in the storage unit 23-2, and the temperature data and the third processed data may be stored in the storage unit 23-3.

Alternatively, N=2, and the data providing system 1A may include two storage units 23-1 to 23-2. In this case, for example, sensing data may be stored in the storage unit 23-1, and processed data may be stored in the storage unit 23-2.

Alternatively, N=6, and the data providing system 1A may include six storage units 23-1 to 23-6. In this case, for example, the vibration data may be stored in the storage unit 23-1, the audio data may be stored in the storage unit 23-2, and the temperature data may be stored in the storage unit 23-3. In addition, the first processed data may be stored in the storage unit 23-4, the second processed data may be stored in the storage unit 23-5, and the third processed data may be stored in the storage unit 23-6.

As described above, the vibration data, the audio data, the temperature data, the first processed data, the second processed data, and the third processed data may be stored in corresponding storage units (that is, a dedicated storage unit) among the plurality of storage units 23-1 to 23-N.

The configuration of the second example embodiment other than the above is similar to that of the first example embodiment described above. Therefore, in the second example embodiment, substantially the same operation as in the first example embodiment described above is performed, and the same effect as in the first example embodiment described above can be obtained. Therefore, the detailed description of the operation and effect of the second example embodiment will be omitted.

Third Example Embodiment

Next, a configuration example of a data providing system 1B according to the third example embodiment will be described with reference to FIG. 7.

Figure 7:
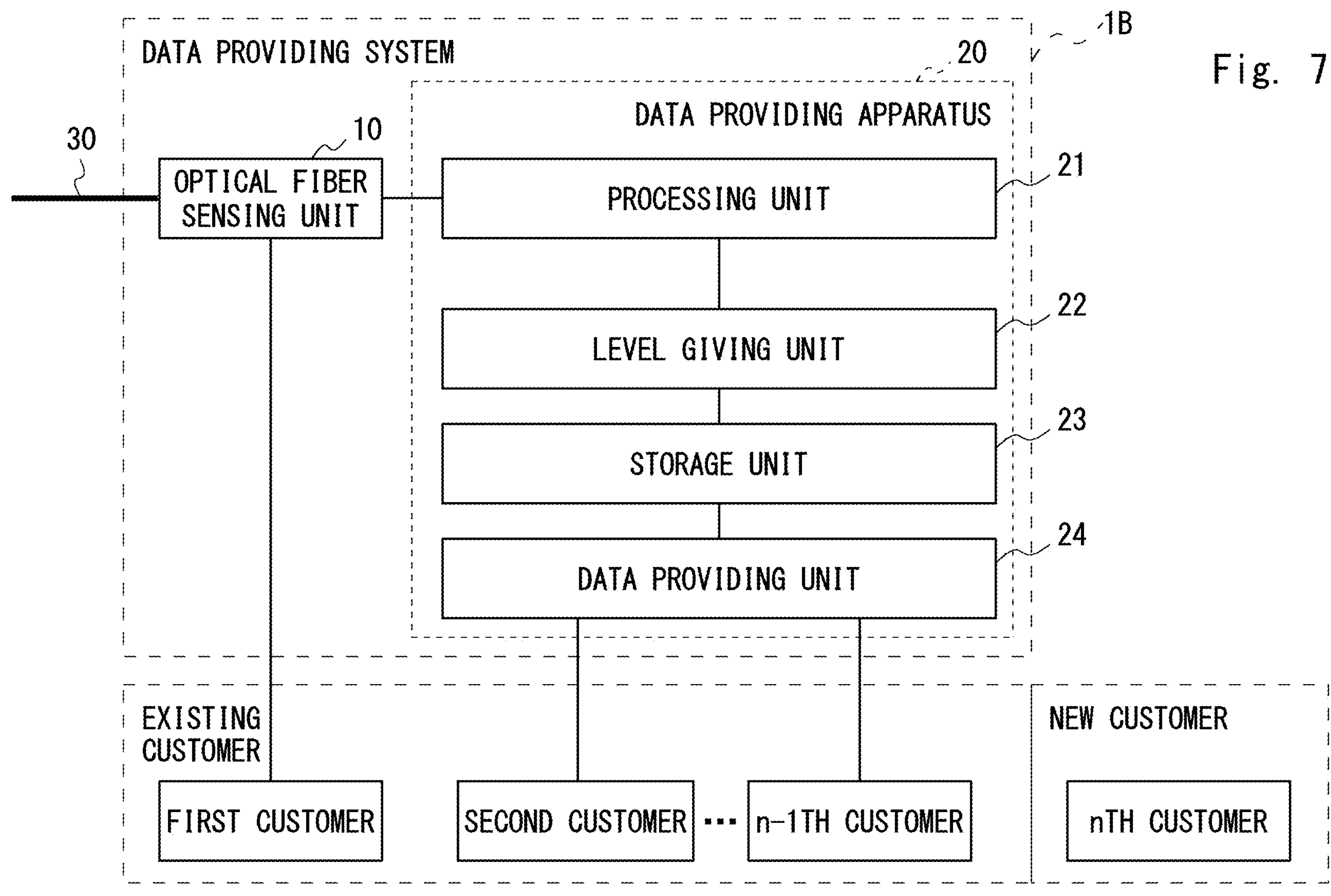
FIG. 7 is a diagram illustrating a configuration example of a data providing system according to a third example embodiment.

As illustrated in FIG. 7, a data providing system 1B according to the third example embodiment is different from the data providing system 1 according to the first example embodiment described above in a configuration related to processing of sensing data acquired by an optical fiber sensing unit 10.

That is, in the third example embodiment, the access level is not given to the sensing data by the level giving unit 22. In addition, the sensing data is not stored in the storage unit 23. In addition, the sensing data is directly provided from the optical fiber sensing unit 10 to a specific customer (in FIG. 1, the first customer) without passing through the data providing unit 24.

As described above, the sensing data may be provided only to a specific customer, the sensing data may not be provided to other customers, and only the processed data may be provided to other customers. Furthermore, with the configuration illustrated in FIG. 7, the load related to the processing of the sensing data is reduced.

The configuration of the third example embodiment other than the above is similar to that of the first example embodiment described above. Therefore, in the third example embodiment, substantially the same operation as in the first example embodiment described above is performed, and the same effect as in the first example embodiment described above can be obtained. Therefore, the detailed description of the operation and effect of the third example embodiment will be omitted.

Another Example Embodiment

In the above-described first to third example embodiments, in a case where the plurality of access levels is set for the customer, the data providing unit 24 may generate a menu indicating data corresponding to the access level among the individual data for each of the plurality of access levels to present the plurality of generated menus to the customer. Note that presenting the menu to the customer specifically means transmitting the menu to the device of the customer.

For example, it is assumed that a plurality of access levels "A, B" is set for a certain customer. In this case, the data providing unit 24 generates a menu indicating data corresponding to the access level "A" and a menu indicating data corresponding to the access level "B", and presents the menus to the customer. The customer selects at least one of the presented menus. The data providing unit 24 provides the customer with data corresponding to the menu selected by the customer.

Furthermore, in the above-described first to third example embodiments, the storage units 23 and 23-1 to 23-N are provided at the subsequent stage of the level giving unit 22, but the positions of the storage units 23 and 23-1 to 23-N are not limited thereto. For example, the storage units 23 and 23-1 to 23-N may be provided in a preceding stage of the level giving unit 22.

Hardware Configuration of Data Providing Apparatus According to Example Embodiment Next, a hardware configuration example of a computer 40 that implements the data providing apparatus 20 according to the above-described first to third example embodiments will be described with reference to FIG. 8.

Figure 8:
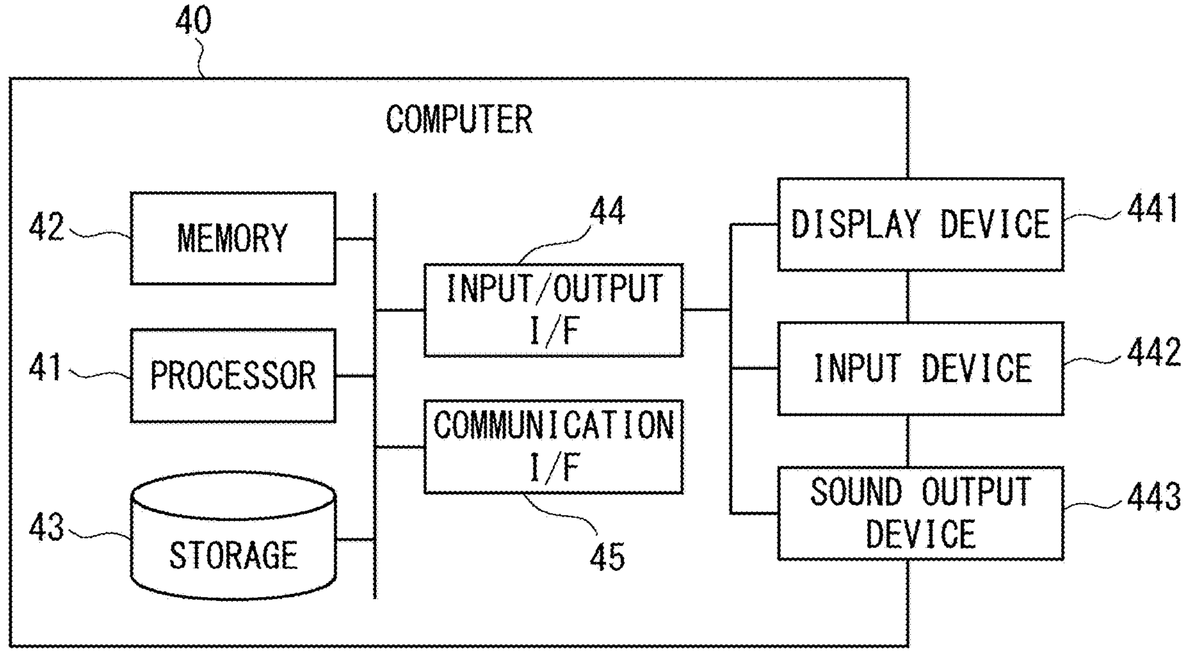
FIG. 8 is a block diagram illustrating a hardware configuration example of a computer that implements the data providing apparatuses according to the first to third example embodiments.

As illustrated in FIG. 8, the computer 40 includes a processor 41, a memory 42, a storage 43, an input/output interface (input/output I/F) 44, a communication interface (communication I/F) 45, and the like. The processor 41, the memory 42, the storage 43, the input/output interface 44, and the communication interface 45 are connected by a data transmission path for mutually transmitting and receiving data.

The processor 41 is, for example, an arithmetic processing device such as a central processing unit (CPU) or a graphics processing unit (GPU). The memory 42 is, for example, a memory such as a random access memory (RAM) or a read only memory (ROM). The storage 43 is, for example, a storage device such as a hard disk drive (HDD), a solid state drive (SSD), or a memory card. Furthermore, the storage 43 may be a memory such as a RAM or a ROM.

The storage 43 stores, for example, a program. This program includes a command group (or software code) for causing a computer to perform one or more functions in the data providing apparatus 20 described in the above-described first to third example embodiments when read by the computer. The processing unit 21, the level giving unit 22, and the data providing unit 24 included in the data providing apparatus 20 may be realized by the processor 41 reading and executing a program stored in the storage 43. Here, when executing the program described above, the processor 41 may read the program on the memory 42 and then execute the program, or may execute the program without reading the program on the memory 42. The memory 42 and the storage 43 also serve as the storage units 23 and 23-1 to 23-N included in the data providing apparatus 20. In addition, the memory 42 and the storage 43 also serve to implement a function of the data providing unit 24 included in the data providing apparatus 20 to hold information (for example, the information in FIG. 4).

Furthermore, the above-described program may be stored in a non-transitory computer-readable medium or a tangible storage medium. As an example and not by way of limitation, the computer readable medium or the tangible storage medium includes a RAM, a ROM, a flash memory, an SSD or other memory technology, a compact disc (CD)-ROM, a digital versatile disc (DVD), a Blu-ray (registered trademark) disk or other optical disk storage, a magnetic cassette, a magnetic tape, a magnetic disk storage, or other magnetic storage devices. Furthermore, the program described above may be transmitted on a temporary computer readable medium or a communication medium. As an example and not by way of limitation, the transitory computer readable medium or the communication medium includes an electrical signal, an optical signal, an acoustic signal, or other forms of propagation signals.

The input/output interface 44 is connected to a display device 441, an input device 442, a sound output device 443, and the like. The display device 441 is a device that displays a screen corresponding to drawing data processed by the processor 41, such as a liquid crystal display (LCD), a cathode ray tube (CRT) display, or a monitor. The input device 442 is a device that receives an operation input of an operator, and is, for example, a keyboard, a mouse, a touch sensor, or the like. The display device 441 and the input device 442 may be integrated and implemented as a touch panel. The sound output device 443 is a device that acoustically outputs a sound corresponding to audio data processed by the processor 41, such as a speaker.

The communication interface 45 transmits and receives data to and from an external device. For example, the communication interface 45 communicates with an external device via a wired communication path or a wireless communication path.

The present disclosure has been described above with reference to the example embodiments, but the present disclosure is not limited to the example embodiments described above. Various modifications that could be understood by those skilled in the art can be made to the configuration and details of the present disclosure within the scope of the present disclosure.

For example, some or all of the above-described example embodiments may be used in combination with each other.

In addition, some or all of the above-described example embodiments may be described in the appendix below, but are not limited thereto.

Supplementary Note 1

A data providing system including:

an optical fiber sensing unit configured to acquire sensing data by executing optical fiber sensing;

a processing unit configured to generate processed data by executing processing on the sensing data;

a level giving unit configured to give an access level according to a type to individual data included in the sensing data and the processed data; and a data providing unit configured to provide the individual data to a customer according to the access level.

Supplementary Note 2

The data providing system according to Supplementary Note 1, in which the type of the sensing data is classified based on a detection target in the optical fiber sensing.

Supplementary Note 3

The data providing system according to Supplementary Note 2, in which the type of the processed data is classified based on a service provided using the processed data.

Supplementary Note 4

The data providing system according to Supplementary Note 3, in which the optical fiber sensing unit acquires vibration data, audio data, and temperature data as the sensing data by executing the optical fiber sensing, and the processing unit generates first processed data, second processed data, and third processed data as the processed data by executing processing on the vibration data, the audio data, and the temperature data.

Supplementary Note 5

The data providing system according to Supplementary Note 4, further including a storage unit configured to store the vibration data, the audio data, the temperature data, the first processed data, the second processed data, and the third processed data.

Supplementary Note 6

The data providing system according to Supplementary Note 4, further including a plurality of storage units configured to store data of a type corresponding to itself among the vibration data, the audio data, the temperature data, the first processed data, the second processed data, and the third processed data.

Supplementary Note 7

The data providing system according to any one of Supplementary Notes 1 to 6, in which the data providing unit in a case where a plurality of access levels is set for the customer, generates, for each of the plurality of access levels, a menu indicating data corresponding to the access level among the individual data, and presents a plurality of menus to the customer, and provides, to the customer, data corresponding to the menu selected by the customer from among the plurality of menus.

Supplementary Note 8

A data providing apparatus including:

a processing unit configured to generate processed data by executing processing on sensing data acquired by executing optical fiber sensing in an optical fiber sensing unit;

a level giving unit configured to give an access level according to a type to individual data included in the sensing data and the processed data; and a data providing unit configured to provide the individual data to a customer according to the access level.

Supplementary Note 9

The data providing apparatus according to Supplementary Note 8, in which the type of the sensing data is classified based on a detection target in the optical fiber sensing.

Supplementary Note 10

The data providing apparatus according to Supplementary Note 9, in which the type of the processed data is classified based on a service provided using the processed data.

Supplementary Note 11

The data providing apparatus according to Supplementary Note 10, in which the processing unit generates first processed data, second processed data, and third processed data as the processed data, by executing processing on vibration data, audio data, and temperature data acquired as the sensing data by executing the optical fiber sensing in the optical fiber sensing unit.

Supplementary Note 12

The data providing apparatus according to Supplementary Note 11, further including a storage unit configured to store the vibration data, the audio data, the temperature data, the first processed data, the second processed data, and the third processed data.

Supplementary Note 13

The data providing apparatus according to Supplementary Note 11, further including a plurality of storage units configured to store data of a type corresponding to itself among the vibration data, the audio data, the temperature data, the first processed data, the second processed data, and the third processed data.

Supplementary Note 14

The data providing apparatus according to any one of Supplementary Notes 8 to 13, in which the data providing unit in a case where a plurality of access levels is set for the customer, generates, for each of the plurality of access levels, a menu indicating data corresponding to the access level among the individual data, and presents a plurality of menus to the customer, and provides, to the customer, data corresponding to the menu selected by the customer from among the plurality of menus.

Supplementary Note 15

A data providing method by a data providing apparatus, the data providing method including:

a processing step of generating processed data by executing processing on sensing data acquired by executing optical fiber sensing in an optical fiber sensing unit;

a level giving step of giving an access level according to a type to individual data included in the sensing data and the processed data; and a data providing step of providing the individual data to a customer according to the access level.

Supplementary Note 16

The data providing method according to Supplementary Note 15, in which the type of the sensing data is classified based on a detection target in the optical fiber sensing.

Supplementary Note 17

The data providing method according to Supplementary Note 16, in which the type of the processed data is classified based on a service provided using the processed data.

Supplementary Note 18

The data providing method according to Supplementary Note 17, in which in the processing step, processing is executed on vibration data, audio data, and temperature data acquired as the sensing data by executing the optical fiber sensing in the optical fiber sensing unit, thereby generating first processed data, second processed data, and third processed data as the processed data.

Supplementary Note 19

The data providing method according to Supplementary Note 18, further including a storage step of storing the vibration data, the audio data, the temperature data, the first processed data, the second processed data, and the third processed data in a storage unit.

Supplementary Note 20

The data providing method according to Supplementary Note 18, further including a storage step of storing the vibration data, the audio data, the temperature data, the first processed data, the second processed data, and the third processed data in a corresponding storage unit among a plurality of storage units.

Supplementary Note 21

The data providing method according to any one of Supplementary Notes 15 to 20, in which the data providing step includes in a case where a plurality of access levels is set for the customer, generating, for each of the plurality of access levels, a menu indicating data corresponding to the access level among the individual data, and presenting the plurality of menus to the customer, and providing, to the customer, data corresponding to the menu selected by the customer from among the plurality of menus.

REFERENCE SIGNS LIST

1, 1A, 1B DATA PROVIDING SYSTEM
10 OPTICAL FIBER SENSING UNIT
20 DATA PROVIDING APPARATUS
21 PROCESSING UNIT
22 LEVEL GIVING UNIT
23, 23-1 to 23-N STORAGE UNIT
24 DATA PROVIDING UNIT
30 OPTICAL FIBER CABLE
40 COMPUTER
41 PROCESSOR
42 MEMORY
43 STORAGE
44 INPUT/OUTPUT INTERFACE
441 DISPLAY DEVICE
442 INPUT DEVICE
443 SOUND OUTPUT DEVICE
45 COMMUNICATION INTERFACE

What is claimed is:

1. A data providing system comprising:

at least one memory storing instructions, and at least one processor configured to execute the instructions to;

acquire a set of sensing data by executing optical fiber sensing, the set of sensing data comprising a plurality of types of sensing data including vibration data, audio data, and temperature data;

generate a set of processed data by executing processing on the set of sensing data, the set of processed data comprises a plurality of types of processing data including first processed data, second processed data, and third processed data;

give an access level to individual data included in the set of sensing data and the set of processed data according to one or more data type of the individual data selected from the group of the plurality of types of sensing data and the plurality of types of processing data; and provide the individual data to a customer according to the access level;

in a case where a plurality of access levels is set for the customer, generate, for each of the plurality of access levels, a menu indicating data corresponding to the access level among the individual data, and present a plurality of menus to the customer, and provide, to the customer, data corresponding to the menu selected by the customer from among the plurality of menus, wherein the type of the sensing data is classified based on a detection target in the optical fiber sensing, and wherein the type of the processed data is classified based on a service provided using the processed data.

2. The data providing system according to claim 1, wherein the at least one memory further stores the vibration data, the audio data, the temperature data, the first processed data, the second processed data, and the third processed data.

3. The data providing system according to claim 1, wherein the at least one memory includes a plurality of memories configured to store data of a type corresponding to itself among the vibration data, the audio data, the temperature data, the first processed data, the second processed data, and the third processed data.

4. A data providing apparatus comprising:

at least one memory storing instructions, and at least one processor configured to execute the instructions to;

generate a set of processed data by executing processing on a set of sensing data acquired by executing optical fiber sensing in an optical fiber sensing unit, the set of sensing data comprising a plurality of types of sensing data including vibration data, audio data, and temperature data and the set of processed data comprises a plurality of types of processing data including first processed data, second processed data, and third processed data;

give an access level to individual data included in the set of sensing data and the set of processed data according to one or more data type of the individual data selected from the group of the plurality of types of sensing data and the plurality of types of processing data; and provide the individual data to a customer according to the access level;

in a case where a plurality of access levels is set for the customer, generate, for each of the plurality of access levels, a menu indicating data corresponding to the access level among the individual data, and present a plurality of menus to the customer, and provide, to the customer, data corresponding to the menu selected by the customer from among the plurality of menus, wherein the type of the sensing data is classified based on a detection target in the optical fiber sensing, and wherein the type of the processed data is classified based on a service provided using the processed data.

5. The data providing apparatus according to claim 4, wherein the at least one memory further stores the vibration data, the audio data, the temperature data, the first processed data, the second processed data, and the third processed data.

6. The data providing apparatus according to claim 4, wherein the at least one memory includes a plurality of memories configured to store data of a type corresponding to itself among the vibration data, the audio data, the temperature data, the first processed data, the second processed data, and the third processed data.

7. The data providing apparatus according to claim 4, wherein the at least one processor is further configured to execute the instructions to in a case where a plurality of access levels is set for the customer, generate, for each of the plurality of access levels, a menu indicating data corresponding to the access level among the individual data, and present a plurality of menus to the customer, and provide, to the customer, data corresponding to the menu selected by the customer from among the plurality of menus.

8. A data providing method by a data providing apparatus, the data providing method comprising:

a processing step of generating a set of processed data by executing processing on a set of sensing data acquired by executing optical fiber sensing in an optical fiber sensing unit, the set of sensing data comprising a plurality of types of sensing data including vibration data, audio data, and temperature data and the set of processed data comprises a plurality of types of processing data including first processed data, second processed data, and third processed data;

a level giving step of giving an access level according to a type to individual data included in the sensing data and the processed data; and a data providing step of providing the individual data to a customer according to the access level;

a generating step of generating, in a case where a plurality of access levels is set for the customer, for each of the plurality of access levels, a menu indicating data corresponding to the access level among the individual data, and present a plurality of menus to the customer, and a providing step of providing, to the customer, data corresponding to the menu selected by the customer from among the plurality of menus, wherein the sensing data is classified based on a detection target in the optical fiber sensing, and wherein the type processed data is classified based on a service provided using the processed data.

9. The data providing method according to claim 8, further comprising a storage step of storing the vibration data, the audio data, the temperature data, the first processed data, the second processed data, and the third processed data in a memory.

10. The data providing method according to claim 8, further comprising a storage step of storing the vibration data, the audio data, the temperature data, the first processed data, the second processed data, and the third processed data in a corresponding memory among a plurality of memories.

* * * * *